United States Patent
Liang et al.

(10) Patent No.: US 11,182,409 B2
(45) Date of Patent: Nov. 23, 2021

(54) DATA PROCESSING WITH TAGS

(71) Applicant: International Business Machines Corporation, Armonk, NY (US)

(72) Inventors: Qi Liang, Shanghai (CN); Donald W. Schmidt, Stone Ridge, NY (US); Daniel Rosa, Highland, NY (US); Gui Yu Jiang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 16/197,852

(22) Filed: Nov. 21, 2018

(65) Prior Publication Data
US 2020/0159854 A1    May 21, 2020

(51) Int. Cl.
G06F 16/28    (2019.01)
G06F 16/26    (2019.01)
G06F 16/25    (2019.01)

(52) U.S. Cl.
CPC .......... *G06F 16/287* (2019.01); *G06F 16/258* (2019.01); *G06F 16/26* (2019.01)

(58) Field of Classification Search
None
See application file for complete search history.

(56) References Cited

U.S. PATENT DOCUMENTS

| | | |
|---|---|---|
| 7,418,456 B2 | 8/2008 | Charlet et al. |
| 8,688,676 B2 | 4/2014 | Rush et al. |
| 2002/0129339 A1* | 9/2002 | Callahan, II ........ G06F 11/3466 717/127 |
| 2009/0287729 A1* | 11/2009 | Chen .................... G06F 11/3676 |
| 2012/0297389 A1* | 11/2012 | Haham ................... G06F 8/451 718/102 |
| 2014/0279834 A1 | 9/2014 | Tsirogiannis et al. |
| 2014/0337715 A1 | 11/2014 | Madden |
| 2015/0355903 A1 | 12/2015 | Chancey et al. |
| 2017/0139687 A1 | 5/2017 | Balasubramanian et al. |

FOREIGN PATENT DOCUMENTS

WO    2017134665 A1    8/2017

OTHER PUBLICATIONS

Dummer, "Customized Parsing New Features: Derived Fields and Derived Tags," Loggly, Oct. 19, 2015, 4 pages <https://www.loggly.com/blog/> (https://www.loggly.com/blog/topic/product-news/>.
Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Hau H Hoang
(74) *Attorney, Agent, or Firm* — Peter J. Edwards

(57) ABSTRACT

A source code defining record structure of data is received. The source code includes data tags which provide information for processing to be performed on the data. Data tagging metadata is generated based on the source code, and the data tagging metadata includes record structure information and the data tags. And data is processed according to the data tagging metadata.

17 Claims, 9 Drawing Sheets

DATA PROCESSING WITH TAGS

BACKGROUND

The present invention relates to data processing, and more specifically, to a method, system and computer program product for processing data in a storage format.

In the computer industry, it's a common practice to collect data for analysis for different purposes. The data is usually stored in a well-defined binary format, which is compact to save data storage space and network bandwidth for transferring it. Usually, the data stored in a binary format consists of a large number records. The records can be in same or different formats, and have fixed or variable lengths. Each record contains many fields, where the actual data is stored.

SUMMARY

According to one embodiment of the present invention, there is provided a method for processing data. In the method, a source code defining record structure of the data is received. The source code includes data tags which provide information for processing to be performed on the data. Data tagging metadata is generated based on the source code, and the data tagging metadata includes record structure information and the data tags. Data is processed according to the data tagging metadata.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of, the following detailed description of the example embodiments of the present invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
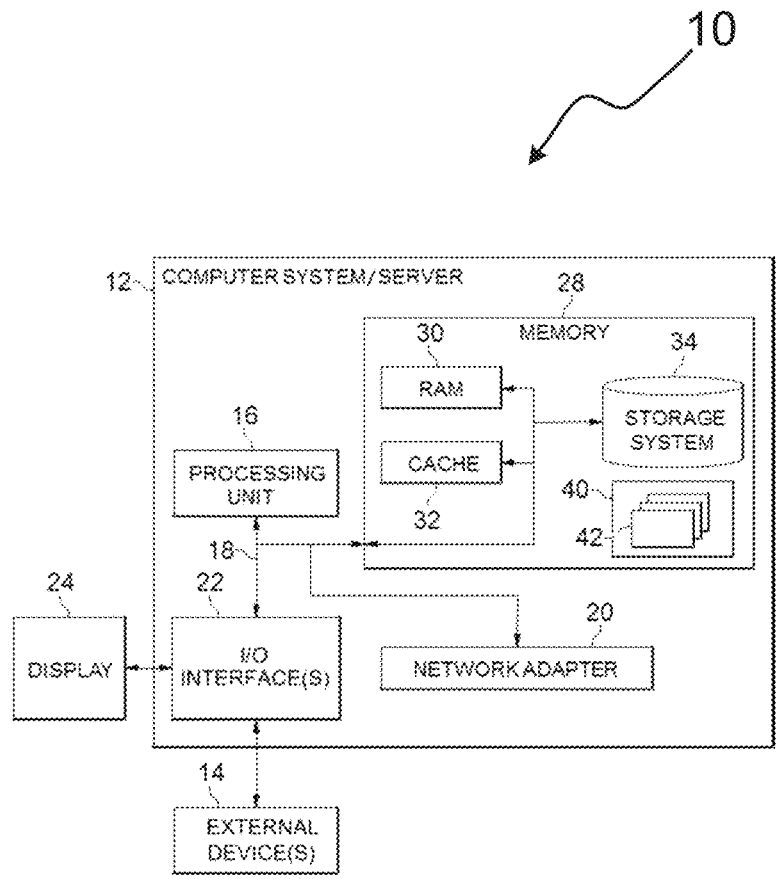
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Embodiments of the present invention can be deployed on cloud computer systems which will be described in the following. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
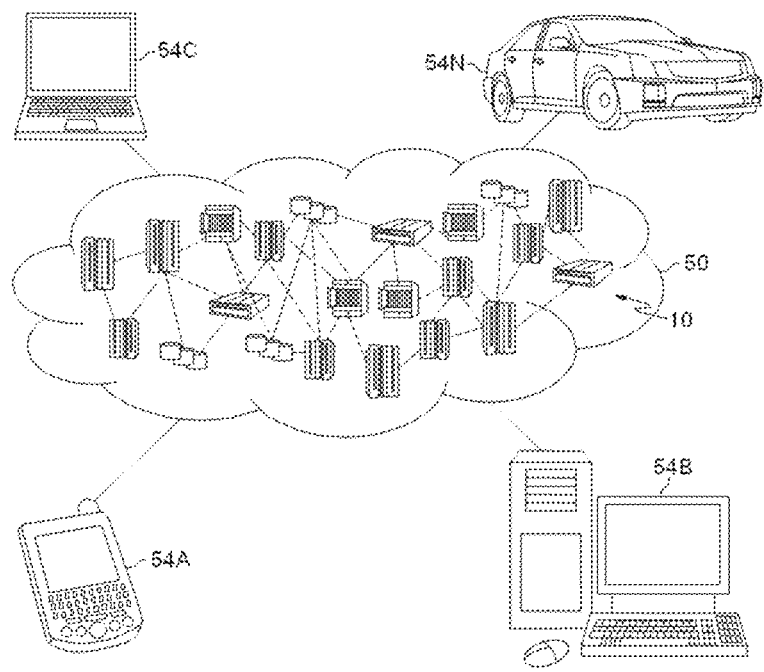
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
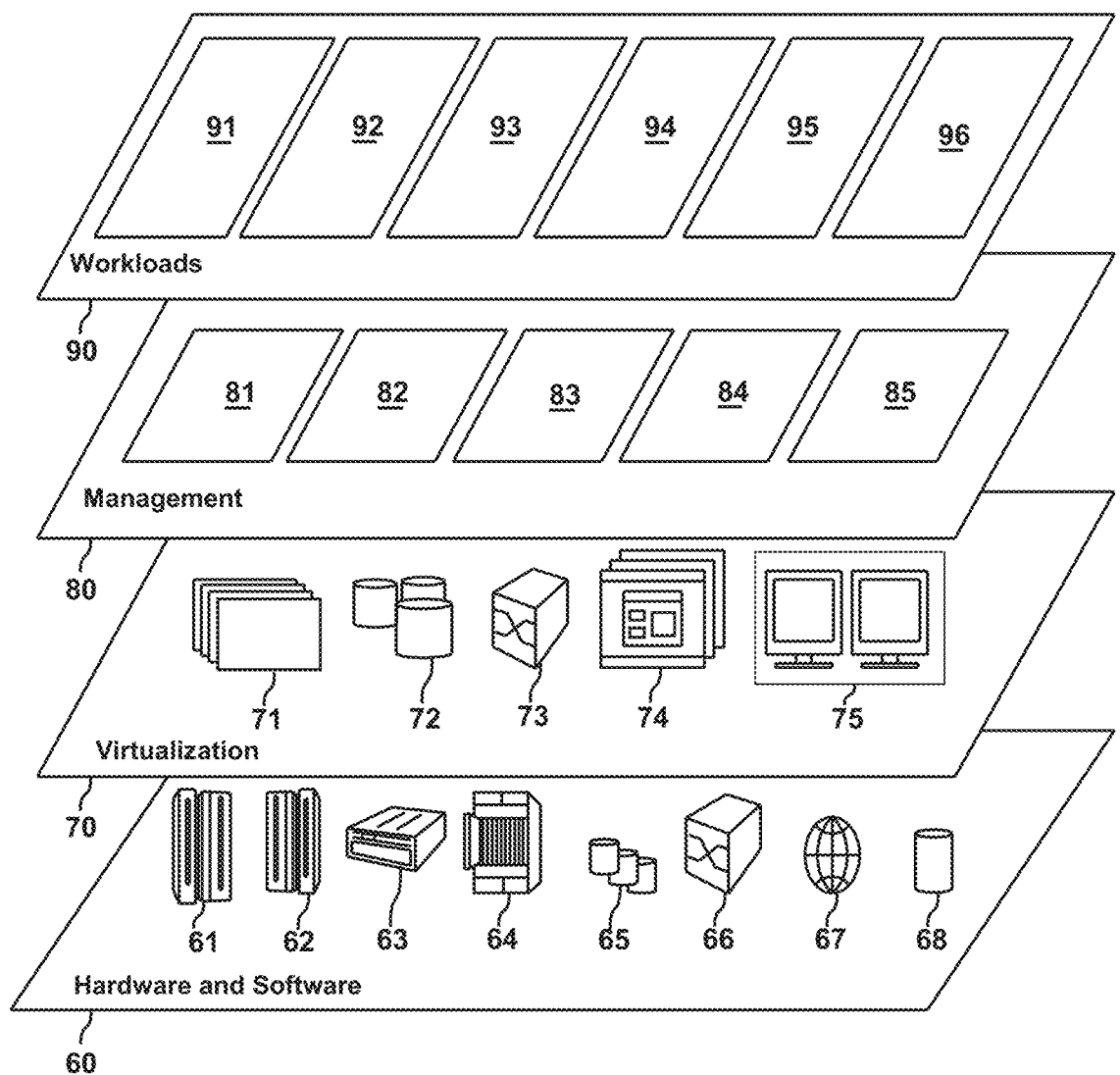
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data processing 96.

It is noted that, in addition to the cloud system described above, embodiments of the present disclosure can be implemented in any computer and network systems. Also the present disclosure is not limited to the computer system described above, for example, with reference to FIG. 1.

As mentioned earlier, data is usually stored in a well-defined binary format. Binary formats tend to use up less memory and provide faster access to data as compared to text-based format. The binary format may also be called a storage format in the context of the present disclosure since it is defined mostly for efficient storage. Usually, the data stored in a storage format consists of a large number records. The records can be in same or different formats, and have fixed or variable lengths. And each record may contain many fields, where the actual data is stored.

The characteristic feature of a storage format is that there is no simple rule for determining how many bits or how many bytes constitute a basic unit of information. It is necessary to have a description of the rules for the storage format that states what information is stored and how many bits or bytes are used for each unit of information.

Therefore, a storage format normally is not convenient for analysis and visualization. The data in a storage format usually need to be post-processed. Some data are aggregated, filtered, calculated, grouped, etc., while some data are discarded. Usually, a specialized program has to be developed to parse data in a storage format, analyze the data and save the analysis result in an analysis format, and visualize the analysis result. The program needs understand the data in a storage format, and the meaning of each individual field in a record in the data. It is expensive to develop the specialized program, especially when there are hundreds of record types in the data and there are more and more analysis requirements over time.

The embodiments of the present invention provide a data processing method that uses a data tagging approach to define how to use the data fields to process the data in a storage format in the source code where the data fields are defined. The data tags may be defined in the comments of field definition in the source code, indicating how to parse the data field, analyze it, do data filtering, and visualize it. The generalized data parsing, analysis, and visualization framework can be built upon this approach, and will be elaborated as below.

The embodiments of the present invention may avoid developing specialized program for data post-processing. It makes it easy to support the analysis for new data, by introducing data tags for new data. And furthermore, the knowledge of subject matter experts can be embedded into the system where/when the data fields are defined, avoiding misinterpreting data, especially when the data is comprehensive and complicated.

Figure 4:
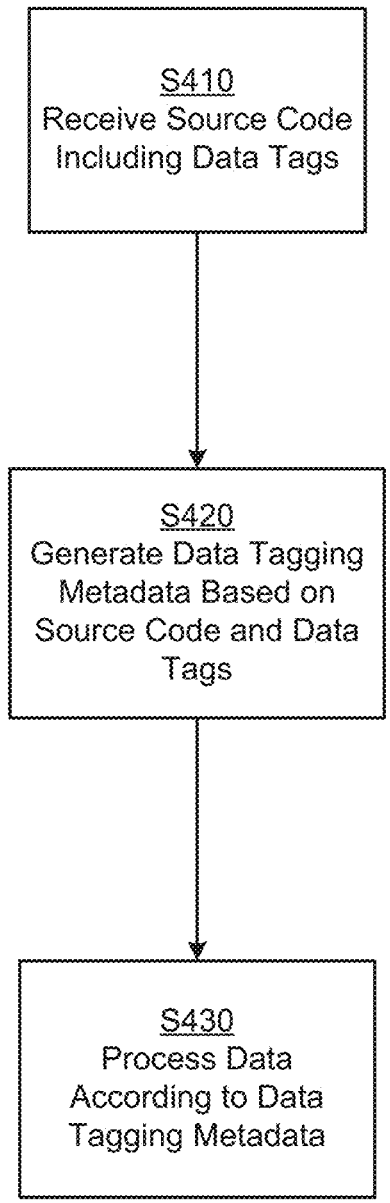
FIG. 4 depicts a flow diagram of a method according to an embodiment of the present invention.

Referring now to FIG. 4, a flow diagram of a method according to an embodiment of the present invention is shown. In step S410, a source code defining record structure of the data is received. The source code includes data tags which provide information for processing to be performed on the data. According to embodiments of the present invention, the data tags may be defined in the comment or annotation parts in the source code.

In step S420, data tagging metadata is generated based on the source code. According to an embodiment of the present invention, the data tagging metadata may include record structure information obtained from the source code as well as the data tags obtained from the source code.

In step S430, the data is processed according to the data tagging metadata. According to an embodiment of the present invention, the processing on the data may include data parsing, data analysis, data filtering, or data visualization.

Figure 5:
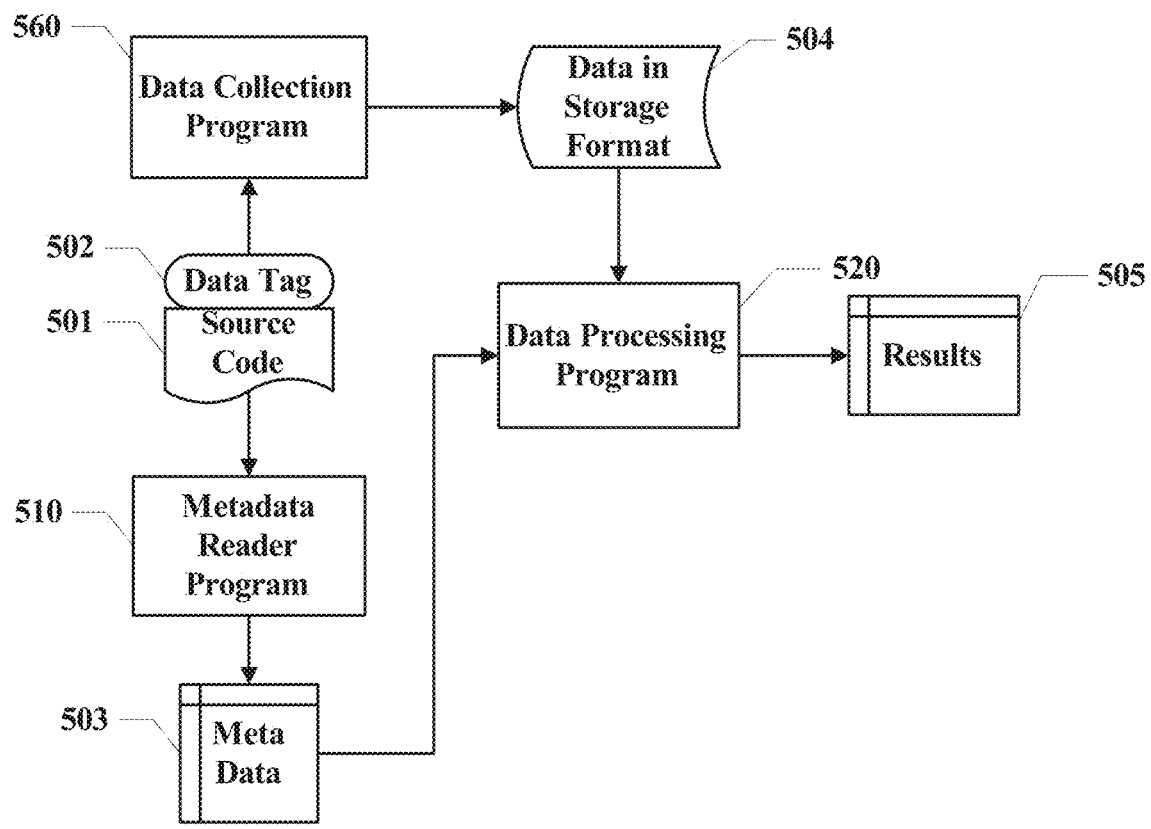
FIG. 5 depicts a diagram of a system according to an embodiment of the present invention.

Referring now to FIG. 5, a diagram of a system according to an embodiment of the present invention is shown. It is understood that the system shown in FIG. 5 is intended to be illustrative only and is not limiting the scope of the present invention.

As shown in FIG. 5, the source code 501 is used to define record structure of a data. And data collection program 560 may be obtained by compiling the source code 501. With data collection program 560, the data in a storage format 504 may be obtained, with the record structure as defined by the source code 501. According to an embodiment of the present invention, the source code 501 includes data tags 502, which are defined to indicate how to process data and use them in the following processing of the data. Metadata reader program 510 receives the source code 501, reads in data tags 502 from the source code 501, and generates data tagging metadata 503 accordingly. Data processing program 520 processes data stored in a storage format 504 with the data tagging metadata 503, and obtains results 505 of data processing.

According to embodiments of the present invention, the data processing performed by data processing program 520 may include various processing, such as data parsing, analysis, visualization, filtering, etc. And data processing program 520 may be implemented as a data parser program, a data analysis program, a visualization program, etc.

The processes performed by the system will be elaborated as follows.

As mentioned above, the storage format of data is usually defined in the data structure of the source code. Here a piece of source code in C language is taken as an example to illustrate the embodiments of the present invention. It would be understood that the embodiments of the present invention can be easily extended to other programming language.

A struct in the C programming language (and many derivatives) is a composite data type (or record) declaration that defines a physically grouped list of variables to be placed under one name in a block of memory, allowing the different variables to be accessed via a single pointer, or the struct declared name which returns the same address.

The general syntax for a struct declaration in C is:

```
struct tag_name {
    type member 1;
    type member 2;
    ...
};
```

For example,

```
struct cpu_utilization {
    int space;
    int utilization;
}
``` defines a type, referred to as "cpu_utilization". To create a new variable of this type, it can be written as below struct cpu_utilization cpu;

which has an integer component, accessed by "space" and an integer component, accessed by "utilization". The structure "cpu" contains all two values, and the two fields may be changed independently. A pointer to an instance of the "cpu_utilization" structure will point to the memory address of the first variable, "space". The total storage required for a struct object is the sum of the storage requirements of all the fields, plus any internal padding.

According to an embodiment of the present invention, the data tags may be defined in the comments of the struct members. Each struct member defines a field in a record of the storage format. The data tag can be in any syntax with the eye-catcher characters, so that they can be recognized easily from the comments by the metadata reader program. In this case, the syntax like "++TagName([Parameter1], [Parameter2], . . . )" is used. The TagName is required in the syntax, while the parameters are optional. One tag can have no or more than one parameters.

An example source code with data tags is shown as below.

```
#define ALL 0              // ++FILTER_DEFINE(Disk IO Type)
                           // ++FILTER_TYPE(All, Read + Write,
DEFAULT)
#define READ 1             // ++FILTER_TYPE(Read)
#define WRITE 2            // ++FILTER_TYPE(Write)
#define KERNEL 1           // ++FILTER_DEFINE(Space)
++FILTER_TYPE(Kernel)
#define USER_SPACE 2          // ++FILTER_TYPE(User Space)
#define INCOMING 1            // ++FILTER_DEFINE(Network
Traffic)
                              // ++FILTER_TYPE(Incoming)
#define OUTGOING 2            // ++FILTER_TYPE(Outgoing)
struct record {
    int recordType           // ++RECORD_TYPE(1)
    long timestamp;          // ++TYPE(TIMESTAMP)
```

-continued

```
++X_AXIS(Time)
    int memoryConsumption;          // ++LINE_PATTERN(Memory
Consumption (MB))
                                    // ++LEFT_Y_AXIS ++GROUP(Overview)
    struct cpu_utilization cpu;     // ++STRUCT(CPU Utilization)
    struct disk_io * diskIO;        // ++POINTER(Disk IO)
    struct network_io * networkIO;  // ++POINTER(Network IO)
};
    struct cpu_utilization {        //++STRUCT(CPU Utilization)
        int space;                  // ++FILTER_BY_DATA(Space)
        int utilization;            // ++FILTER_BY_SHADE(Space)
++LEFT_Y_AXIS
                                    // ++LINE_PATTERN (CPU Utilizations%)
    }
    struct disk_io {                // ++STRUCT(Disk IO)
        long readBytes;             // ++LINE_PATTERN(Disk IO Bytes
(MB) ) ++RIGHT_Y_AXIS
                                    // ++FILTER_BY_MAP(Disk IO Type)
++FILTER_TYPE(Read)
        long writtenBytes;          // ++LINE_PATTERN(Disk IO Bytes
(MB) ) ++ RIGHT_Y_AXIS
                                    // ++FILTER_BY_MAP(Disk IO Type)
++FILTER_TYPE(Write)
        struct disk io * next;
    }
    struct network io {             // ++STRUCT(Network IO)
        int ioType;                 // ++FILTER_BY_DATA(Network
Traffic)
        int bytes;                  // ++LINE_PATTERN(Transferred Bytes
(MB)) ++RIGHT_Y AXIS
                                    // ++FILTER_BY_MAP(Network Traffic)
                                    // ++FILTER_TYPE(Incoming)
++FILTER_TYPE(Outgoing)
        struct network_io * next;
    };
```

According to another embodiment of the present invention, the data tags may be defined in the source code annotation. Below is an example of a piece of source code in Java, with data tags defined in annotation. In this case, the syntax like "@TagName([Parameter1], [Parameter2], . . . )" is used. The TagName is required in the syntax, while the parameters are optional.

```
class record {
    @TYPE(TIMESTAMP)
    @X_AXIS(Time)
    long timestamp;
    @LINE_PATTERN(Memory Consumption (MB))
    @LEFT_Y_AXIS
    @GROUP(Overview)
    int memoryconsumption;
    . . .
    }
```

The tags may be divided into different tag categories. For example, there may be four tag categories, which are Data Structure Tags, Analysis Tags, Filtering Tags, and Visualization Tags. It would be understood that the above four tag categories are just for illustrative purpose and other kind of tag categories may be used. Furthermore, it is only for descriptive purpose to divide the tags into different tag categories. According to an embodiment of the present invention, there is no need to divide the tags into different categories and the data processing program 520 may identify the type of a tag by its TagName.

A further description of tag categories is given by way of example below.

"Data Structure Tags" instruct a data parser program how to parse the individual fields out of the record. In the following example, the tags with TagName "STRUCT" or "POINTER" are examples of Data Structure Tags.

```
struct record {
    . . .
    struct cpu_utilization cpu;     // ++STRUCT(CPU Utilization)
    struct disk_io * diskIO;        // ++POINTER(Disk IO)
    . . .
};
    struct cpu_utilization {        //++STRUCT(CPU Utilization)
        int space;                  // ++FILTER_BY_DATA(Space)
        int utilization;            // ++FILTER_BY_SHADE(Space)
++LEFT_Y_AXIS
                                    // ++LINE_PATTERN (CPUUtilization %)
    }
    struct disk_io {                // ++STRUCT(Disk IO)
        long readBytes;             // ++LINE_PATTERN(Disk IO Bytes
(MB)) ++RIGHT_Y_AXIS
                                    // ++FILTER_BY_MAP(Disk IO Type)
```

```
++FILTER_TYPE(Read)
     long writtenBytes;         // ++LINE_PATTERN(Disk IO Bytes
(MB)) ++RIGHT_Y_AXIS
                                // ++FILTER_BY_MAP(Disk IO Type)
++FILTER_TYPE(Write)
     struct disk _io * next;
  }
```

Usually, the record is defined with more than one C language struct. One struct member is defined as pointer, pointing to another struct, or defined as another struct. In the above example, the tag "++POINTER(Disk IO)" in the comment of "struct disk_io*diskIO" indicates the field diskIO is a pointer, pointing to struct "disk_io". The tag "++STRUCT(CPU Utilization)" in the comment of "struct cpu_utilization cpu" indicates the field "cpu" is expanded with struct "cpu utilization".

A more complicated example may be that one struct member points to the continuous area where an array of structs are defined, while another struct member specifies the number of elements in the array.

Data tags may be used to define the relationship of these structs so that the parser can know how to parse the individual fields out from record.

"Analysis Tags" instruct a data analysis program how to interpret a field.

```
struct record {
    long timestamp; // ++TYPE(TIMESTAMP) ++X_AXIS(Time)
    ...
```

In the above example, the tag "++TYPE(TIMESTAMP)" is an example of Analysis Tag, which indicates the field timestamp is a Unix timestamp. The parameter "TIMESTAMP" is the type name. With this tag, an analysis/visualization program can know how to show or format this field.

```
struct record {
    ...
    int memoryconsumption;   // ++LINE_PATTERN(Memory
    Consumption (MB))
                             // ++LEFT_Y_AXIS
    ++GROUP(Overview)
```

Another example of Analysis Tags is "++LINE_PATTERN", as shown above. It indicates this field is treated as a metric during analysis. The parameter "Memory Consumption (MB)" defines its name shown in visualization. A formula can be defined as the second parameter of "++LINE_PATTERN", so that calculation can be performed by the data analysis program.

"Visualization Tags" instruct a visualization program how to visualize the data.

```
struct record {
    long timestamp;         // ++TYPE(TIMESTAMP) ++X_AXIS(Time)
    int memoryconsumption;// ++LINE_PATTERN(Memory Consumption (MB))
                           // ++LEFT_Y_AXIS ++GROUP(Overview)
    ...
}
struct network_io {         // ++STRUCT(Network IO)
    int ioType;             // ++FILTER_BY_DATA(IO_TYPE)
    int bytes;              // ++LINE_PATTERN(Transferred Bytes (MB))
++RIGHT_Y_AXIS
                            // ++FILTER_TYPE(READ)
++FILTER_TYPE(WRITE)
    struct network_io * next;
};
```

In the above example, "++X_AXIS", "++LEFT_Y_AXIS", and "++RIGHT_Y_AXIS" are examples of Visualization Tags. The tag "++X_AXIS (Time)" specifies the field "timestamp" to be shown on an X axis with the name of "Time". The tag "++LEFT_Y_AXIS" specifies the field "memoryConsumption" to be shown on a right Y axis. And the tag "++RIGHT_Y_AXIS" specifies the field "Transferred Bytes" to be shown on a left Y axis.

According to an embodiment of the present invention, more than one line pattern can be defined on a Y axis, and the end user can select some of them for visualization.

"Filtering Tags" instruct both data a analysis program and a visualization program how to filter the data.

```
#define ALL 0     // ++FILTER_DEFINE(Disk IO Type)
                  // ++FILTER_TYPE(All, Read + Write, DEFAULT)
#define READ 1    // ++FILTER_TYPE(Read)
#define WRITE 2   // ++FILTER_TYPE(Write)
```

In the above example, the tag "++FILTER_DEFINE" defines a filter named "Disk IO Type". The following "++FILTER_TYPE" define a series of filter types belonging to "Disk IO Type", like "All", "Read", and "Write". The type "All" is shown as default, and it combines the metric values of disk reads and disk writes, according to "++FILTER_TYPE(All, Read+Write, DEFAULT).

```
struct disk_io {                // ++STRUCT(Disk IO)
    long readBytes;             // ++LINE_PATTERN(Disk IO Bytes (MB))
++RIGHT_Y_AXIS
                                // ++FILTER_BY_MAP(Disk IO Type)
++FILTER_TYPE(Read)
    long writtenBytes;          // ++LINE_PATTERN(Disk IO Bytes (MB))
++RIGHT_Y_AXIS
                                // ++FILTER_BY_MAP(Disk IO Type)
++FILTER_TYPE(Write)
    struct disk _io * next;
}
```

The tag "++FILTER_BY MAP" and "++FILTER_TYPE" defined on readBytes and writtenBytes informs the data analysis program to associate these two members to filter type "Read" and "Writer" individually.

```
#define INCOMING 1 // ++FILTER_DEFINE(Network Traffic)
++FILTER_TYPE(Incoming)
#define OUTGOING 2 // ++FILTER_TYPE(Outgoing)
struct network_io { // ++STRUCT(Network IO)
    int type; // ++FILTER_BY_DATA(Network Traffic)
    int bytes; // ++LINE_PATTERN (Transferred Bytes (MB)) ++RIGHT_Y_AXIS
        // ++FILTER_BY_MAP(Network Traffic)
        // ++FILTER_TYPE(Incoming) ++FILTER_TYPE(Outgoing)
    struct network_io * next;
};
```

According to another embodiment of the present invention, one member in C language struct may be defined as the filter type value with the tag "++FILTER_BY_DATA". In this example, the member "type" is examined against the filter "Network Traffic", to identify whether the member "bytes" is for "Incoming" or "Outgoing". The member "bytes" has both "++FILTER_TYPE(Incoming)" and "++FILTER_TYPE(Outgoing)" defined. Therefore, depending on the value of member "type", the member "bytes" can be incoming network traffic or outgoing network traffic.

Referring back to FIG. 5, metadata reader program 510 receives the source code 501, reads in data tags 502 from the source code 501, and generates data tagging metadata 503.

According to an embodiment of the present invention, metadata reader program 510 reads in the source code defining record structure, knowing the size of individual fields by examining their C-language data types like long and int, and the struct relationship with the tags like "++POINTER" and "++STURCT". It can infer the field type, length, and offset from C language data type, for example int or long for numeric fields, char[ ] for text fields, long for 8-byte length, etc. The tag "++TYPE" can give more meaningful type information for analysis, like Unix timestamp.

The record structures like field names, field lengths, and their offsets in records, together with the data tags, such as Data Structure Tags, Analysis Tags, Filtering Tags, and Visualization Tags, are stored in the data tagging metadata 503, which is the output of metadata reader program 510. Data tagging metadata will be used to guide the following data processing, such as data parsing, analysis, filtering, and visualization.

In the example of Java, if the data tags are defined in Java annotation, the annotation may be embedded in the class files by a Java compiler. And those annotation may be read from class files by the metadata reader program, and associated with a data field.

Figure 6:
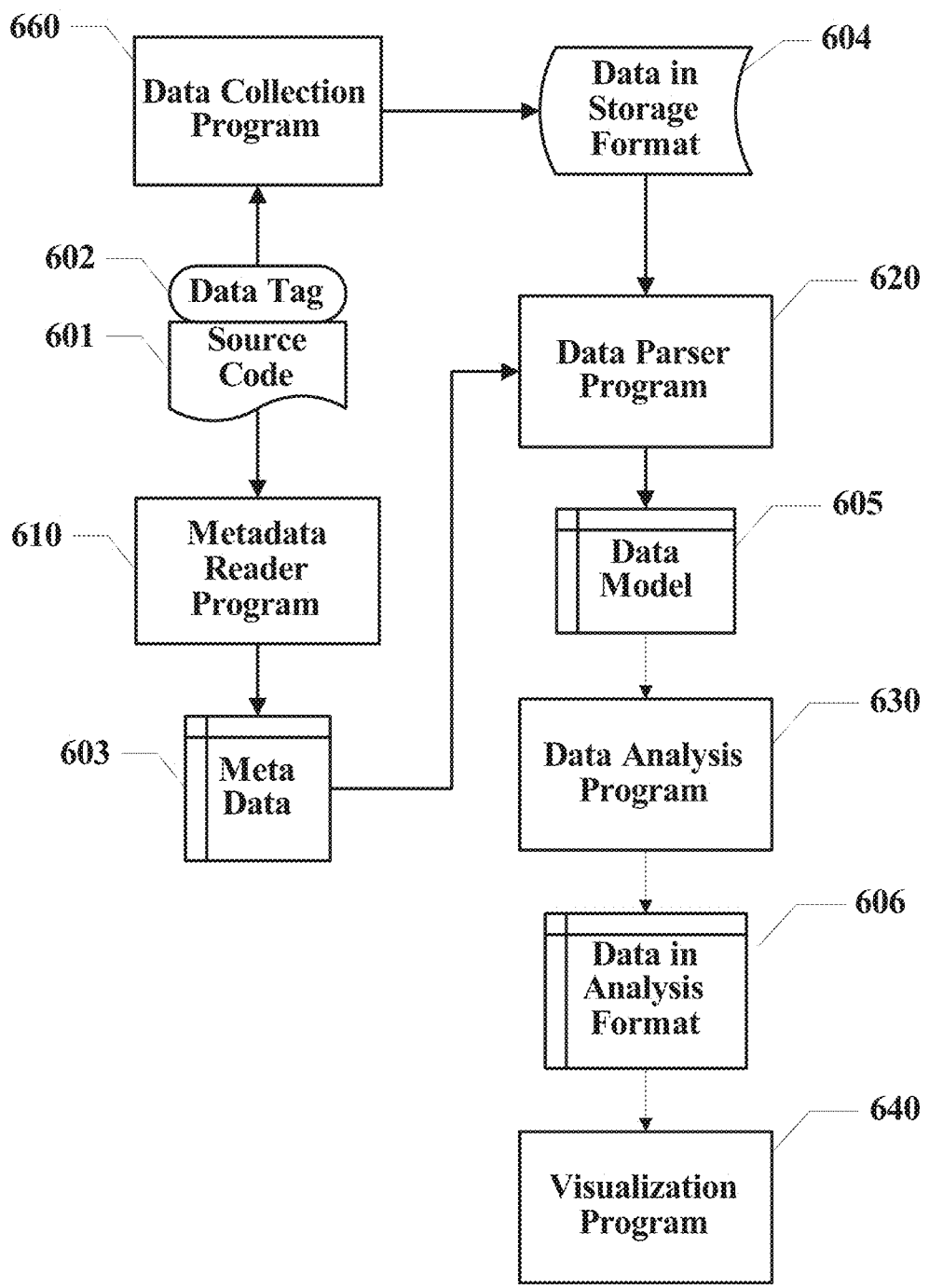
FIG. 6 depicts a more detailed diagram of a system according to an embodiment of the present invention.

Referring now to FIG. 6, a further detailed system diagram according to an embodiment of the present invention is shown. It is understood that the system shown in FIG. 6 is intended to be illustrative only and is not limiting to the scope of the present invention. For the sake of simplicity, the description to the components similar with those in FIG. 5 will be omitted here.

As shown in FIG. 6, data parser program 620 parses the data in a storage format 604 according to data tagging metadata 603, and saves the resulting data model 605 in the memory. The resulting data model 605 include data values of the record and at least a part of data tagging metadata.

Usually, the data consists of a large number of records. One or two bytes at the fixed position in a record indicate the record type. In the following source code example, the tag "++RECORD_TYPE" specifies the first field (two bytes) for the record type. If the value of recordType is "1", data parser program 620 can use this "struct record" to parse the current record. Knowing the record type, data parser program 620 may parse the records independently.

```
struct record {
    int recordType              // ++RECORD_TYPE(1)
    long timestamp;             // ++TYPE(TIMESTAMP)
++X_AXIS(Time)
    int memoryConsumption;      // ++LINE_PATTERN(Memory
Consumption (MB))
                                // ++LEFT_Y_AXIS ++GROUP(Overview)
    . . .
};
```

According to another embodiment of the present invention, another way is to have all record types share the same header struct for the first part of the record data, including the field with a series of "++RECORD_TYPE" tags, is as follows. In this way, data parser program 620 reads out the recordType field first, and then looks up the proper record struct which may be used for parsing.

```
struct record_header {
    int recordType      // ++RECORD_TYPE(1,record_type_1)
                        //
++RECORD_TYPE(2,record_type_3)
                        //
++RECORD_TYPE(3,record_type_3)
    long timestamp;     // ++TYPE(TIMESTAMP)
++X_AXIS(Time)
    ...
};
struct record_type_1 { ... }
struct record_type_2 { ... }
struct record_type_3 { ... }
```

With data tagging metadata, data parser program 620 may know the structure of a record, like the field name, field length, and their offsets in the record. If the record is defined with a series of structures (like struct in C language), data tagging metadata also provides the relationship of these structures. According to an embodiment of the present invention, the record can be organized in a tree-like structure in memory.

As shown in FIG. 6, data analysis program 630 analyzes the data model 605 which includes at least a part of data tagging metadata, and stores the analyzing result as an analysis format.

Data analysis program 630 processes data model 605 one record by one record. Its output can be the summarized result of all records, or the individual result for each record. The record is typically represented in a tree-like structure in memory. Data analysis program 630 can walk through this tree-like structure, visiting all branches and their leaves from the top to bottom, which is known as visitor pattern in software design. On accessing each branch and leaf, data analysis program 630 checks the data tags on this branch or leaf, according to the analysis tags in data tagging metadata included in the data model. For each data tag, the action will be taken depending on the field (branch or leaf) and the sematic of this tag. If no data tag is found, the leaf will be ignored, but the children of this branch will be examined.

"++LINE_PATTERN(CPU Utilization %)" is an illustrative example. Data analysis program 630 knows that this field should be treated as a line pattern with the name of "CPU Utilization %". And the tag "++RIGHT_Y_AXIS" indicates this line pattern should be drawn on the chart with the scale on a right Y axis.

The analysis result may be stored, for example, on disk, in memory, or serialized as payload of remote procedure call, and passed to a visualization program 640. For the sake of description, the stored analysis result may be called as in an analysis format, and the data in an analysis format refers to those output from the data analysis program. It should be noted that the term of analysis format is used herein for descriptive purposes only and does not refer to any specific format. The JSON format may be used here as an example of the analysis format, but it should be noted that other structured formats like XML may be used for the same result.

The following is an example of the output of data analysis program 630. In this example, there are three records, one collected at 9 AM, one collected at LOAM, and one collected at 11 AM. The field "timestamp" is a Unix timestamp according to data tagging metadata. By default, it is shown as YYYY-MM-DD hh:mm:ss string for human reading.

```
{
    "records": [{
        "Time": "2017-07-18 09:00",
        "CPU Utilization %": 20,
        "Memory Consumption (MB)": 120,
        "Disk IO Bytes (MB)": [
            {"Disk IO Type": 1, "Disk IO Bytes (MB)": 22},
            {"Disk IO Type": 2, "Disk IO Bytes (MB)": 98}
        ],
        "Utilization": [
            {"Space": 1, "CPU Utilization %": 15},
            {"Space": 2, "CPU Utilization %": 5},
        ],
        "Network": [
            {"Type": 1, "Bytes": 100},
            {"Type": 2, "Bytes": 400},
        ]
    },{
        "Time": "2017-07-18 10:00",
        "CPU Utilization %": 30,
        "Memory Consumption (MB)": 100,
        "Disk IO Bytes (MB)": [
            {"Disk IO Type": 1, "Disk IO Bytes (MB)": 24},
            {"Disk IO Type": 2, "Disk IO Bytes (MB)": 90}
        ],
        "Utilization": [
            {"Space": 1, "CPU Utilization %": 5},
            {"Space": 2, "CPU Utilization %": 25},
        ],
        "Network": [
            {"Type": 1, "Bytes": 900},
            {"Type": 2, "Bytes": 300},
        ]
    },{
        "Time": "2017-07-18 11:00",
        "CPU Utilization %": 25,
        "Memory Consumption (MB)": 150,
        "Disk IO Bytes (MB)": [
            {"Disk IO Type": 1, "Disk IO Bytes (MB)": 26},
            {"Disk IO Type": 2, "Disk IO Bytes (MB)": 135}
        ],
        "CPU Utilization": [
            {"Space": 1, "CPU Utilization %": 10},
            {"Space": 2, "CPU Utilization %": 15},
        ],
        "Network": [
            {"Type": 1, "Bytes": 600},
            {"Type": 2, "Bytes": 300},
        ]
    }],
    "xAxis" {
        "name": "Time",
        "path": "records.Time"
    },
    "leftYAxis": [{
        "name": " Memory Consumption (MB)",
        "path": "records. Memory Consumption (MB)",
        "group": "Overview"
    }, {
        "name": "CPU Utilization",
        "path": "records.CPU Utilization.CPU Utilization %",
        "group": "Overview",
        "breakdownBy": "Space",
        "group": "Overview"
    }],
    "rightYAxis": [{
        "name": "Disk IO Bytes (MB)",
        "path": "records.Disk IO Bytes (MB)",
        "group": "Overview"
    }, {
        "name": "Network Transferred Bytes (MB)",
        "path": "records.Network.Bytes",
        "group": "Overview"
    }],
    " filters": [{
```

-continued

```
        "name": "Disk IO Type",
        "path": ["records.Disk IO Bytes (MB).Disk IO Type"],
        "types": [
            {"text": "Read", "value": 1},
            {"text": "Write", "value": 2},
            {"text": "All", "formula": "Read + Write",
"isDefault": true}
        ]
    }, {
        "name": "Network Traffic",
        "path": ["records.Network.Type"],
        "types": [
            {"text": "Incoming", "value": 1},
            {"text": "Outgoing", "value": 2},
        ]
    }, {
        "name": "Space",
        "path": ["records.CPU Utilization.Space"],
        "types": [
            {"text": "Incoming", "value": 1},
            {"text": "Outgoing", "value": 2},
        ]
    }]
}
```

In this example,

A. The attribute "records" contains all data organized in a set of records. In each record, the values of the fields with proper tags are stored in an analysis format.

B. The attribute "xAxis", "leftYAxis", and "rightYAxis" specify how to visualize the line patterns on a chart, and how to locate their values with the attribute "path".

C. The attribute "filters" contains all filters defined with the tag "++FILTER_DEFINE", including their filter types, and the path indicating how to access the value for filtering.

According to an embodiment of the present invention, visualization program 640 visualizes the data in the analysis format 606 according to the visualization tags in the at least a part of the data tagging metadata.

Visualization program 640 reads in the data in the analysis format 606 (for example, JSON format in an embodiment of the present invention), which contains the data (the attribute "records") as well as the metadata derived from data tagging metadata (the attributes like "xAxis", "leftYAxis", "rightYAxis", and "filters").

```
"xAxis" {
    "name": "Time",
    "path": "records.Time"
},
```

The "xAxis" defines the field "Time" is shown on X axis of chart.

```
"leftYAxis": [{
    "name": " Memory Consumption (MB)",
    "path": "records. Memory Consumption (MB)",
    "group": "Overview"
}, {
    "name": "CPU Utilization %",
    "path": "records.CPU Utilization.CPU Utilization %",
    "group": "Overview",
    "breakdownBy": "Space",
    "group": "Overview"
}],
```

The "leftYAxis" defines the field "Memory Consumption" and "CPU Utilization" are shown on left Y axis individually. The attribute "breakdownBy" specifies to show "CPU Utilization %" stacked by "Space".

```
"rightYAxis": [{
    "name": "Disk IO Bytes (MB)",
    "path": "records.Disk IO Bytes (MB)",
    "group": "Overview"
}, {
    "name": "Network Transferred Bytes (MB)",
    "path": "records.Network.Bytes",
    "group": "Overview"
}],
```

The "rightYAixs" specifies the line patterns "Disk IO Bytes (MB)", and "Network Transferred Bytes (MB)" are shown on right Y axis.

Figure 7A:
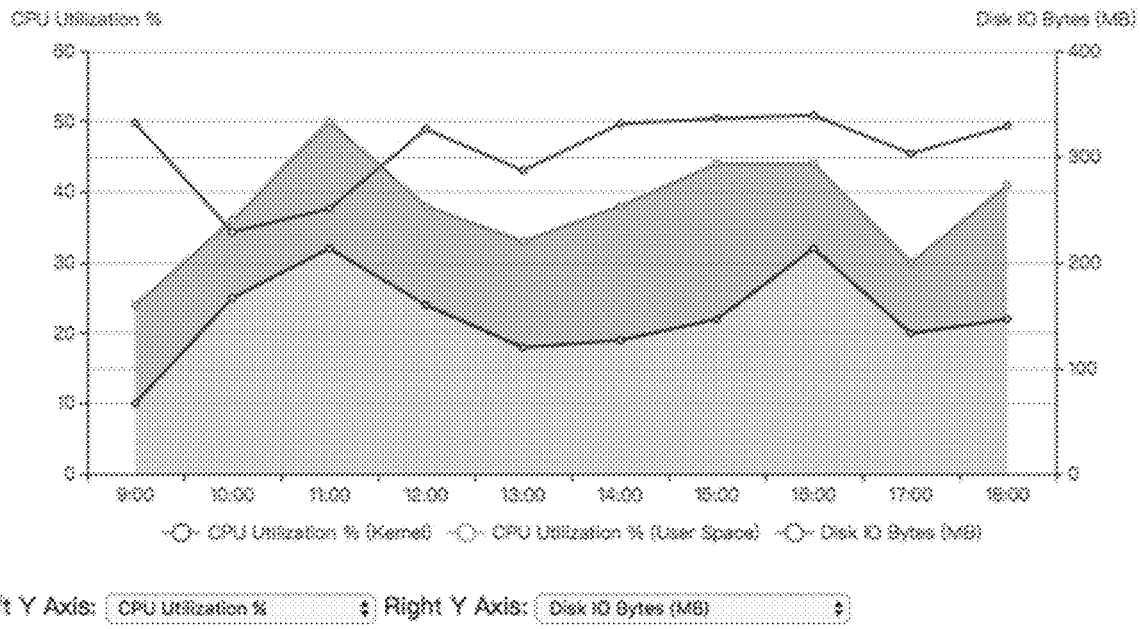
FIG. 7A shows an example of data visualization according to embodiments of the present invention.
Figure 7B:
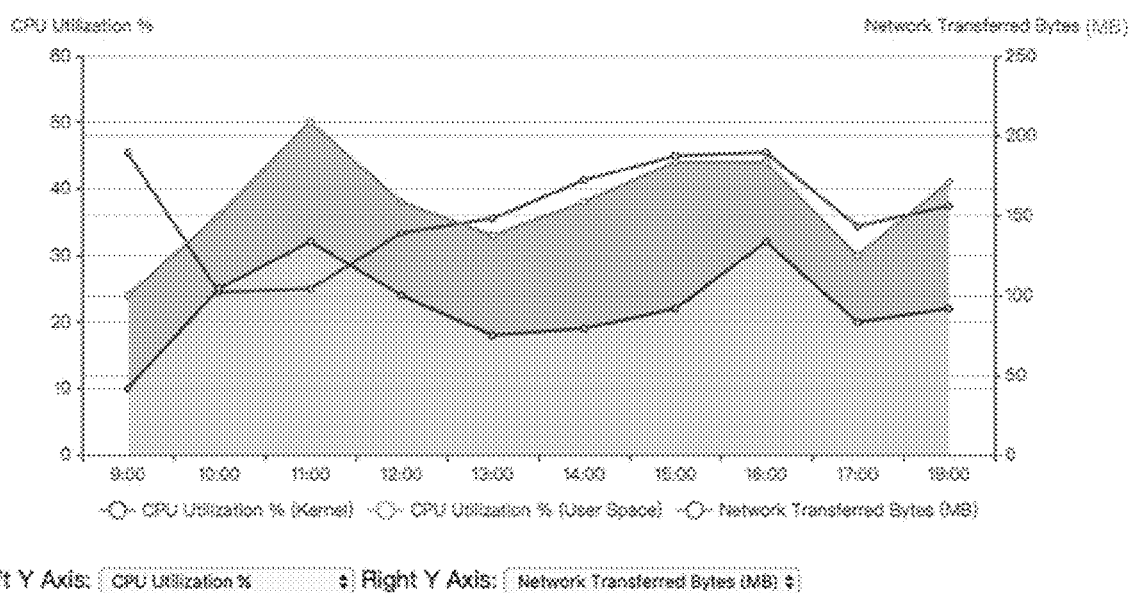
FIG. 7B shows an example of data visualization according to embodiments of the present invention.

According to an embodiment of the present invention, more than one line pattern can be defined on left/right Y axis. FIGS. 7A and 7B show examples of data visualization according to embodiments of the present invention, in which different line patterns are shown on left Y Axis and right Y Axis. In the above example, the end user can select "Memory Consumption (MB)" or "CPU Utilization %" for left Y axis. And "CPU Utilization %" is broken-down by "Kernel" or "User Space". The same thing happens on right Y axis.

```
"filters": [{
    "name": "Disk IO Type",
    "path": ["records.Disk IO Bytes (MB).Disk IO Type"],
    "types": [
        {"text": "Read", "value": 1},
        {"text": "Write", "value": 2},
        {"text": "All", "formula": "Read + Write", "isDefault":
true}
    ]
}, {
    "name": "Network Traffic",
    "path": ["records.Network.Type"],
    "types": [
        {"text": "Incoming", "value": 1},
        {"text": "Outgoing", "value": 2},
    ]
}, {
    "name": "Space",
    "path": ["records.CPU Utilization.Space"],
    "types": [
        {"text": "Incoming", "value": 1},
        {"text": "Outgoing", "value": 2},
    ]
}]
```

Figure 8A:
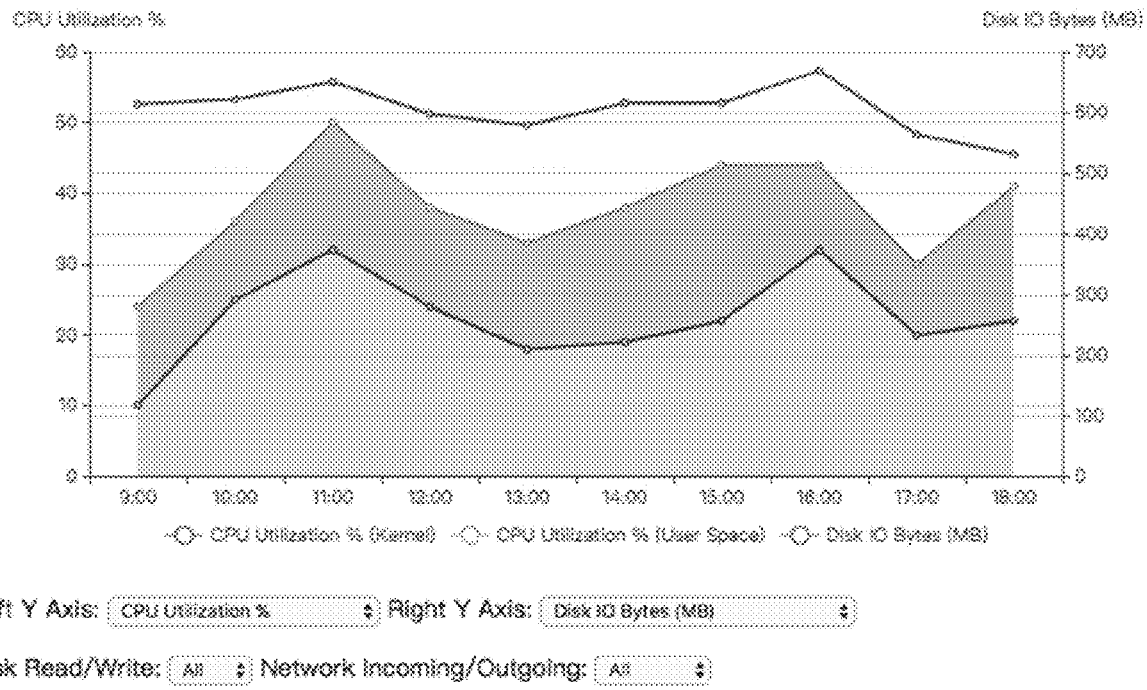
FIG. 8A shows an additional example of data visualization according to embodiments of the present invention.
Figure 8B:
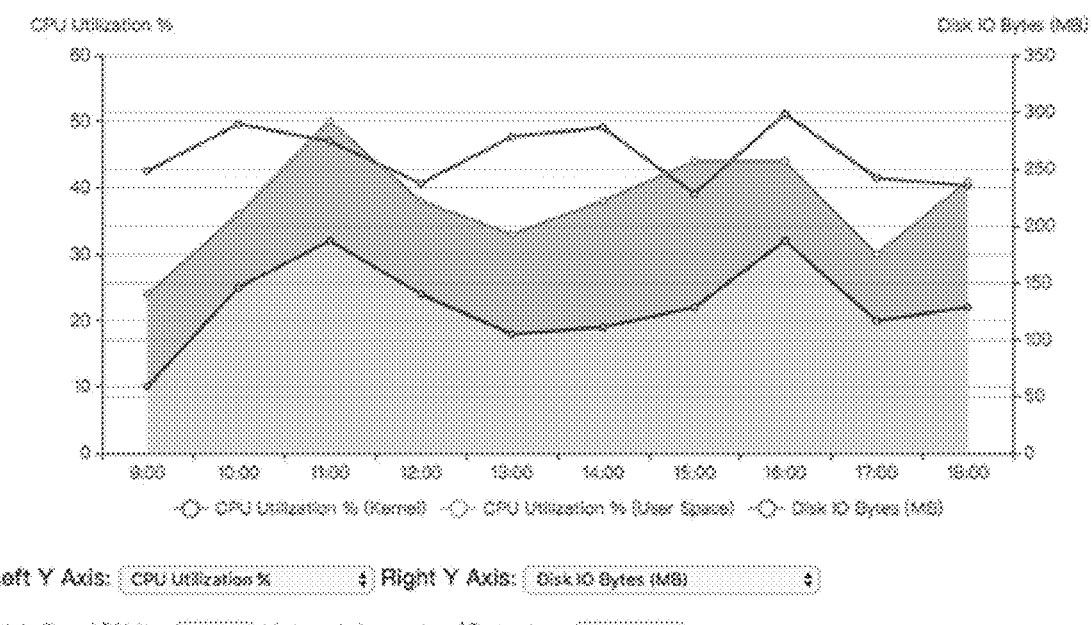
FIG. 8B shows an additional example of data visualization according to embodiments of the present invention.
Figure 8C:
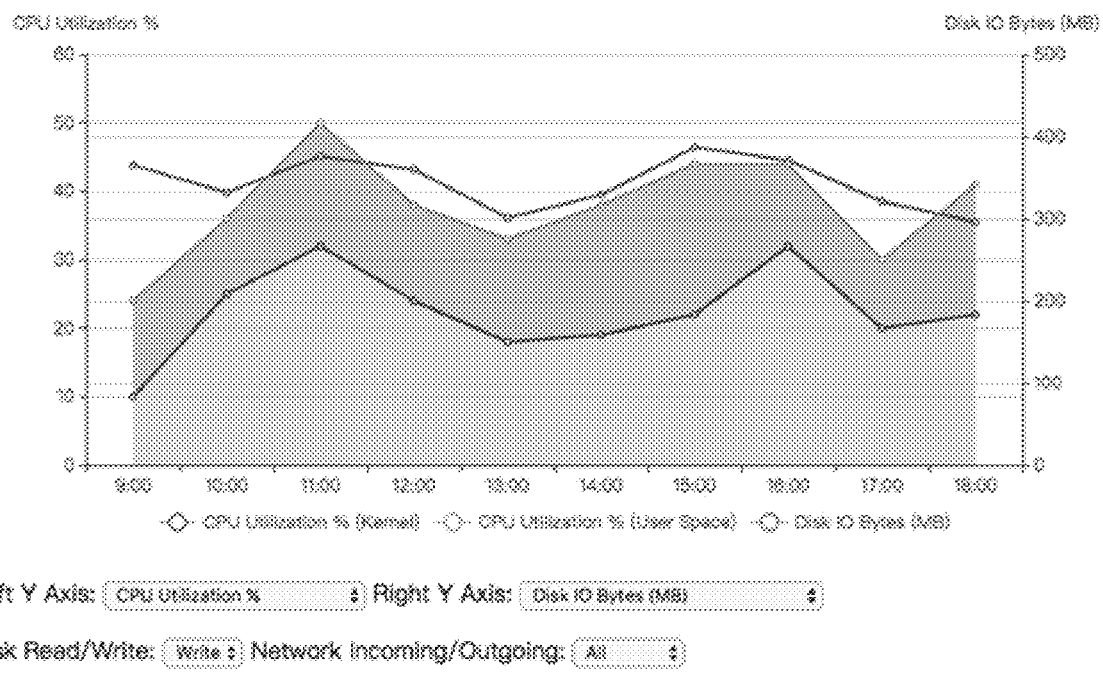
FIG. 8C shows an additional example of data visualization according to embodiments of the present invention.

With the filter metadata defined in the analysis format, it's possible to allow end user to filter the data by the selected filter type. A dropdown list is shown on web page with the filter "Disk IO Type", including three filter types, "All", "Read", and "Write". When end user selects "All" from dropdown list, the formula "Read+Write" sums the value of filter type "Read" and "Write". And the option with "isDefault: true" is selected by default. FIGS. 8A, 8B and 8C show additional examples of data visualization according to embodiments of the present invention, in which the charts with "Disk IO Bytes (MB)" of "All", "Read", and "Write" are shown respectively.

It should be understood in advance that the source codes in C language and Java described above is intended to be illustrative only and embodiments of the present invention are not limited thereto. The embodiments of the present invention may be applicable to any suitable source code.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving, by one or more processing units, a source code defining record structure of data, the source code including data tags that are defined in comments of struct members and that provide information for processing to be performed on the data;
generating, by one or more processing units, data tagging metadata based on the source code, the data tagging metadata including record structure information and the data tags, wherein the data tags include data tags in at least one of the following categories: data structure tag, analysis tag, filtering tag, and visualization tag; and
processing, by one or more processing units, the data according to the data tagging metadata, wherein the processing the data according to the data tagging metadata includes processing the data according to the data tags;
wherein a data structure tag instructs a data parser how to parse individual fields out of a record, an analysis tag instructs a data analysis program how to interpret a field, a filtering tag instructs the data analysis program and a visualization program how to filter data, and a visualization tag instructs the visualization program how to visualize data.

2. The method of claim 1, wherein the data includes records in a plurality of record types and the data tagging metadata is associated with at least one of the plurality of record types.

3. The method of claim 1, wherein the processing, by one or more processing units, the data according to the data tagging metadata includes:
parsing, by one or more processing units, the data according to the data tagging metadata to obtain a data model for a record in the data, the data model including data values of the record and at least a part of the data tagging metadata.

4. The method of claim 3, wherein the processing, by one or more processing units, the data according to the data tagging metadata further includes:
analyzing, by one or more processing units, the data model according to analysis tags in the at least a part of the data tagging metadata; and
storing, by one or more processing units, the analyzed data in an analysis format.

5. The method of claim 4, wherein the processing, by one or more processing units, the data according to the data tagging metadata further includes:
visualizing, by one or more processing units, the data in the analysis format according to visualization tags in the at least a part of the data tagging metadata.

6. The method of claim 4, wherein the processing, by one or more processing units, the data according to the data tagging metadata further includes:
filtering, by one or more processing units, the data in the analysis format according to filtering tags in the at least a part of the data tagging metadata.

7. A system, comprising:
one or more processors;
a memory coupled to at least one of the processors, wherein the one or more processors includes a physical processor; and
a set of computer program instructions stored in the memory and executed by at least one of the processors in order to perform actions of:
receiving a source code defining record structure of data, the source code including data tags that are defined in comments of struct members and that provide information for processing to be performed on the data;
generating data tagging metadata based on the source code, the data tagging metadata including record structure information and the data tags, wherein the data tags include data tags in at least one of the following categories: data structure tag, analysis tag, filtering tag, and visualization tag; and
processing the data according to the data tagging metadata, wherein the processing the data according to the data tagging metadata includes processing the data according to the data tags;
wherein a data structure tag instructs a data parser how to parse individual fields out of a record, an analysis tag instructs a data analysis program how to interpret a field, a filtering tag instructs the data analysis program and a visualization program how to filter data, and a visualization tag instructs the visualization program how to visualize data.

8. The system of claim 7, wherein the data includes records in a plurality of record types and the data tagging metadata is associated with at least one of the plurality of record types.

9. The system of claim 7, wherein the action of processing the data according to the data tagging metadata includes:
parsing the data according to the data tagging metadata to obtain a data model for a record in the data, the data model including data values of the record and at least a part of the data tagging metadata.

10. The system of claim 9, wherein the action of processing the data according to the data tagging metadata further includes:
analyzing the data model according to analysis tags in the at least a part of the data tagging metadata; and
storing the analyzed data in an analysis format.

11. The system of claim 10, wherein the action of processing the data according to the data tagging metadata further includes:
visualizing the data in the analysis format according to visualization tags in the at least a part of the data tagging metadata.

12. The method of claim 10, wherein the action of processing the data according to the data tagging metadata further includes:
filtering the data in the analysis format according to filtering tags in the at least a part of the data tagging metadata.

13. A computer program product comprising a computer readable storage medium having program instructions embodied therewith, wherein the computer readable storage medium is not a transitory signal per se, the program instructions readable by a device to cause the device to perform a method comprising:
receiving a source code defining record structure of data, the source code including data tags that are defined in comments of struct members and that provide information for processing to be performed on the data;
generating data tagging metadata based on the source code, the data tagging metadata including record structure information and the data tags, wherein the data tags include data tags in at least one of the following categories: data structure tag, analysis tag, filtering tag, and visualization tag; and processing the data according to the data tagging metadata, wherein the processing the data according to the data tagging metadata includes processing the data according to the data tags;

wherein a data structure tag instructs a data parser how to parse individual fields out of a record, an analysis tag instructs a data analysis program how to interpret a field, a filtering tag instructs the data analysis program and a visualization program how to filter data, and a visualization tag instructs the visualization program how to visualize data.

14. The computer program product of claim 13, wherein the data includes records in a plurality of record types and the data tagging metadata is associated with at least one of the plurality of record types.

15. The computer program product of claim 13, wherein the processing the data according to the data tagging metadata includes:
    parsing the data according to the data tagging metadata to obtain a data model for a record in the data, the data model including data values of the record and at least a part of the data tagging metadata.

16. The computer program product of claim 15, wherein the processing the data according to the data tagging metadata further includes:
    analyzing the data model according to analysis tags in the at least a part of the data tagging metadata; and
    storing the analyzed data in an analysis format.

17. The computer program product of claim 16, wherein the processing the data according to the data tagging metadata further includes:
    visualizing the data in the analysis format according to visualization tags in the at least a part of the data tagging metadata.

* * * * *